(12) United States Patent
Xu

(10) Patent No.: US 12,105,315 B2
(45) Date of Patent: Oct. 1, 2024

(54) BACKLIGHT MODULE AND DISPLAY DEVICE INCLUDING LIGHT CONCENTRATION STRUCTURE AND VIEWING ANGLE SWITCH ASSEMBLY

(71) Applicant: Shenzhen China Star Optoelectronics Semiconductor Display Technology Co., Ltd., Guangdong (CN)

(72) Inventor: Haotian Xu, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/421,039

(22) PCT Filed: Jun. 15, 2021

(86) PCT No.: PCT/CN2021/100041
§ 371 (c)(1),
(2) Date: Jul. 7, 2021

(87) PCT Pub. No.: WO2022/252285
PCT Pub. Date: Dec. 8, 2022

(65) Prior Publication Data
US 2024/0019623 A1 Jan. 18, 2024

(30) Foreign Application Priority Data
Jun. 2, 2021 (CN) .......................... 202110615326.5

(51) Int. Cl.
*F21V 8/00* (2006.01)
*G02F 1/13* (2006.01)
*G02F 1/29* (2006.01)

(52) U.S. Cl.
CPC ......... *G02B 6/0055* (2013.01); *G02B 6/0023* (2013.01); *G02F 1/1323* (2013.01); *G02F 1/29* (2013.01)

(58) Field of Classification Search
CPC ... G02B 6/0023; G02B 6/0055; G02F 1/1323; G02F 1/29
See application file for complete search history.

(56) References Cited

U.S. PATENT DOCUMENTS

2013/0135358 A1* 5/2013 Yin ...................... G02B 6/0023
445/24
2017/0192150 A1* 7/2017 Bang .................... G02B 6/0068
(Continued)

FOREIGN PATENT DOCUMENTS

| CN | 203744045 | 7/2014 |
|---|---|---|
| CN | 104880760 | 9/2015 |

(Continued)

OTHER PUBLICATIONS

Full English Machine Translation of TW 201516492 A (listed in the IDS filed on Mar. 15, 2022). (Year: 2015).*

*Primary Examiner* — Keith G. Delahoussaye

(57) ABSTRACT

The present application discloses a backlight module and a display device. The backlight module includes a light source assembly, a light concentration structure concentrating light emitted from the light source assembly and emitting the light in a predetermined angle range, a light guide structure guiding the light concentrated by the light concentration structure in a way of mirror reflection out from a light exiting surface of the light guide structure, and a viewing angle switch assembly, wherein the viewing angle switch assembly guides light emitted from the light guide structure outward at a first viewing angle or a second viewing angle.

10 Claims, 8 Drawing Sheets

(56) References Cited

U.S. PATENT DOCUMENTS

| | | | |
|---|---|---|---|
| 2018/0003886 A1* | 1/2018 | Liu | G02B 6/0053 |
| 2018/0210243 A1* | 7/2018 | Fang | G02F 1/137 |
| 2019/0146137 A1* | 5/2019 | Wang | G02B 6/0055 |
| | | | 362/613 |

FOREIGN PATENT DOCUMENTS

| | | |
|---|---|---|
| CN | 105892150 | 8/2016 |
| CN | 107561625 | 1/2018 |
| CN | 109143635 | 1/2019 |
| CN | 109239996 | 1/2019 |
| CN | 111856819 | 10/2020 |
| TW | 201516492 | 5/2015 |
| TW | M584524 | 10/2019 |

* cited by examiner

BACKLIGHT MODULE AND DISPLAY DEVICE INCLUDING LIGHT CONCENTRATION STRUCTURE AND VIEWING ANGLE SWITCH ASSEMBLY

RELATED APPLICATIONS

This application is a National Phase of PCT Patent Application No. PCT/CN2021/100041 having International filing date of Jun. 15, 2021, which claims the benefit of priority of Chinese Patent Application No. 202110615326.5 filed on Jun. 2, 2021. The contents of the above applications are all incorporated by reference as if fully set forth herein in their entirety.

FIELD AND BACKGROUND OF THE INVENTION

The present application relates to a field of displays, especially to a backlight module and a display device.

With development of technology, liquid crystal display devices have been widely used in various fields. A conventional liquid crystal display device comprises a large viewing angle, which is unable to meet people's needs for information security.

Conventional viewing angle adjustment and anti-peep display technologies mainly comprise two types: a first type solution adds an anti-peep film of a shutter microstructure and a liquid crystal film with a variable haze between a backlight module and a display panel to achieve switching of viewing angle. A second type solution adds a third electrode in the display panel to control switching of viewing angle of the display panel. The first type solution has low light energy utilization rate and high power consumption, which is unfavorable for application to mobile devices. The anti-peep mode of the second type solution has low contrast at a front viewing angle and poor display effect.

Therefore, a backlight module and a display device are needed urgently to solve the above technical issue.

SUMMARY OF THE INVENTION

An embodiment of the present application provides a backlight module and a display device to solve a technical issue that a conventional viewing angle adjustment and anti-peep display structure results in a low contrast of the display panel.

An embodiment of the present application provides a backlight module, comprising:
  a light source assembly;
    a light concentration structure disposed along a light exiting direction of the light source assembly, and concentrating light emitted from the light source assembly, and emitting the light in a predetermined angle range;
    a light guide structure disposed along a light exiting direction of the light concentration structure, and guiding and emitting the light concentrated by the light concentration structure outward in a way of mirror reflection out from a light exiting surface of the light guide structure; and
  a viewing angle switch assembly disposed along a light exiting direction of the light guide structure, and guiding the light emitted from the light guide structure outward at a first viewing angle or a second viewing angle.

In the backlight module of the present application, the light concentration structure comprises at least one light concentration element, the light concentration element comprises a light incident surface disposed near the light source assembly, a light exiting surface disposed near the light guide structure, and a light concentration curved surface located between the light incident surface and the light exiting surface, and the light incident surface and the light exiting surface are disposed parallelly.

In the backlight module of the present application, a cross-sectional profile of the light concentration curved surface perpendicular to the light incident surface or the light exiting surface is one of parabola, polynomial curve, Bezier curve, or B-spline curve.

In the backlight module of the present application, the light source assembly comprises a plurality of LED devices, and the light concentration structure comprises a plurality of the light concentration elements in one-to-one correspondence with the LED devices.

In the backlight module of the present application, the light guide structure comprises a reflective bottom surface, a light guide exiting surface located opposite to the reflective bottom surface, and a light guide incident surface and a mirror reflective surface disposed between the reflective bottom surface and the light guide exiting surface, the light guide incident surface is disposed near the light source assembly, the light guide incident surface and the mirror reflective surface are disposed oppositely; and
  wherein the reflective bottom surface comprises at least one reflective surface disposed on and protruding from the light guide structure, and the reflective surface is disposed at an acute angle with each of the light guide exiting surface, the light guide incident surface, and the mirror reflective surface.

In the backlight module of the present application, the reflective bottom surface comprises a plurality of first reflective surfaces, the first reflective surfaces are arranged in an array, and the first reflective surfaces guide incident light entering the light guide incident surface out from the light guide exiting surface.

In the backlight module of the present application, the reflective bottom surface further comprises a plurality of second reflective surfaces, the second reflective surfaces are disposed along a direction facing away from the light guide incident surface and toward the light guide exiting surface, and the first reflective surfaces and the second reflective surfaces are connected to each other and are disposed symmetrically.

In the backlight module of the present application, the backlight module further comprises an inverse prism disposed between the light guide structure and the viewing angle switch assembly, the inverse prism comprises a plurality of inverse prism blocks, and the inverse prism blocks are disposed near a side of the light guide structure.

In the backlight module of the present application, the backlight module further comprises a cylindrical mirror disposed between the inverse prism and the viewing angle switch assembly; and
  wherein the cylindrical mirror comprises a plurality of convex surfaces facing the viewing angle switch assembly.

The present application further provides a display device, the display device comprises a backlight module and a display panel disposed on the backlight module, and the backlight module comprises:
  a light concentration structure disposed along a light exiting direction of the light source assembly, and concentrating light emitted from the light source assembly, and emitting the light in a predetermined angle range;

a light guide structure disposed along a light exiting direction of the light concentration structure, and guiding and emitting the light concentrated by the light concentration structure outward in a way of mirror reflection out from a light exiting surface of the light guide structure; and a viewing angle switch assembly disposed along a light exiting direction of the light guide structure, and guiding the light emitted from the light guide structure outward at a first viewing angle or a second viewing angle.

In the display device of the present application, the light concentration structure comprises at least one light concentration element, the light concentration element comprises a light incident surface disposed near the light source assembly, a light exiting surface disposed near the light guide structure, and a light concentration curved surface located between the light incident surface and the light exiting surface, and the light incident surface and the light exiting surface are disposed parallelly.

In the display device of the present application, the light incident surface and the light exiting surface are disposed parallelly.

In the display device of the present application, a cross-sectional profile of the light concentration curved surface perpendicular to the light incident surface or the light exiting surface is one of parabola, polynomial curve, Bezier curve, or B-spline curve.

In the display device of the present application, the light source assembly comprises a plurality of LED devices, and the light concentration structure comprises a plurality of the light concentration elements in one-to-one correspondence with the LED devices.

In the display device of the present application, the light guide structure comprises a reflective bottom surface, a light guide exiting surface located opposite to the reflective bottom surface, and a light guide incident surface and a mirror reflective surface disposed between the reflective bottom surface and the light guide exiting surface, the light guide incident surface is disposed near the light source assembly, the light guide incident surface and the mirror reflective surface are disposed oppositely; and wherein the reflective bottom surface comprises at least one reflective surface disposed on and protruding from the light guide structure, and the reflective surface is disposed at an acute angle with each of the light guide exiting surface, the light guide incident surface, and the mirror reflective surface.

In the display device of the present application, the reflective bottom surface comprises a plurality of first reflective surfaces, the first reflective surfaces are arranged in an array, and the first reflective surfaces guide incident light entering the light guide incident surface out from the light guide exiting surface.

In the display device of the present application, the reflective bottom surface further comprises a plurality of second reflective surfaces, the second reflective surfaces are disposed along a direction facing away from the light guide incident surface and toward the light guide exiting surface, and the first reflective surfaces and the second reflective surfaces are connected to each other and are disposed symmetrically.

In the display device of the present application, the backlight module further comprises an inverse prism disposed between the light guide structure and the viewing angle switch assembly, the inverse prism comprises a plurality of inverse prism blocks, and the inverse prism blocks are disposed near a side of the light guide structure.

In the display device of the present application, the backlight module further comprises a cylindrical mirror disposed between the inverse prism and the viewing angle switch assembly; and wherein the cylindrical mirror comprises a plurality of convex surfaces facing the viewing angle switch assembly.

Advantages

The present application discloses a backlight module and a display device. The backlight module comprises a light source assembly, a light concentration structure concentrating light emitted from the light source assembly and emitting the light in a predetermined angle range, a light guide structure guiding the light concentrated by the light concentration structure in a way of mirror reflection out from a light exiting surface of the light guide structure, and a viewing angle switch assembly, wherein the viewing angle switch assembly guides the light emitted from the light guide structure outward at a first viewing angle or a second viewing angle. The present application, through the viewing angle switch assembly, makes the display device realize an anti-peep display effect with a switchable viewing angle, and simultaneously, by disposing the light concentration structure between the light source assembly and the light guide structure, emits light emitted from the light source assembly in the predetermined angle range into the light guide structure, and guides out light in a way of mirror reflection by the light guide structure such that on the basis of including an anti-peep display function, the display device has higher light energy utilization rate and contrast.

DESCRIPTION OF SPECIFIC EMBODIMENTS OF THE INVENTION

Figure 1:
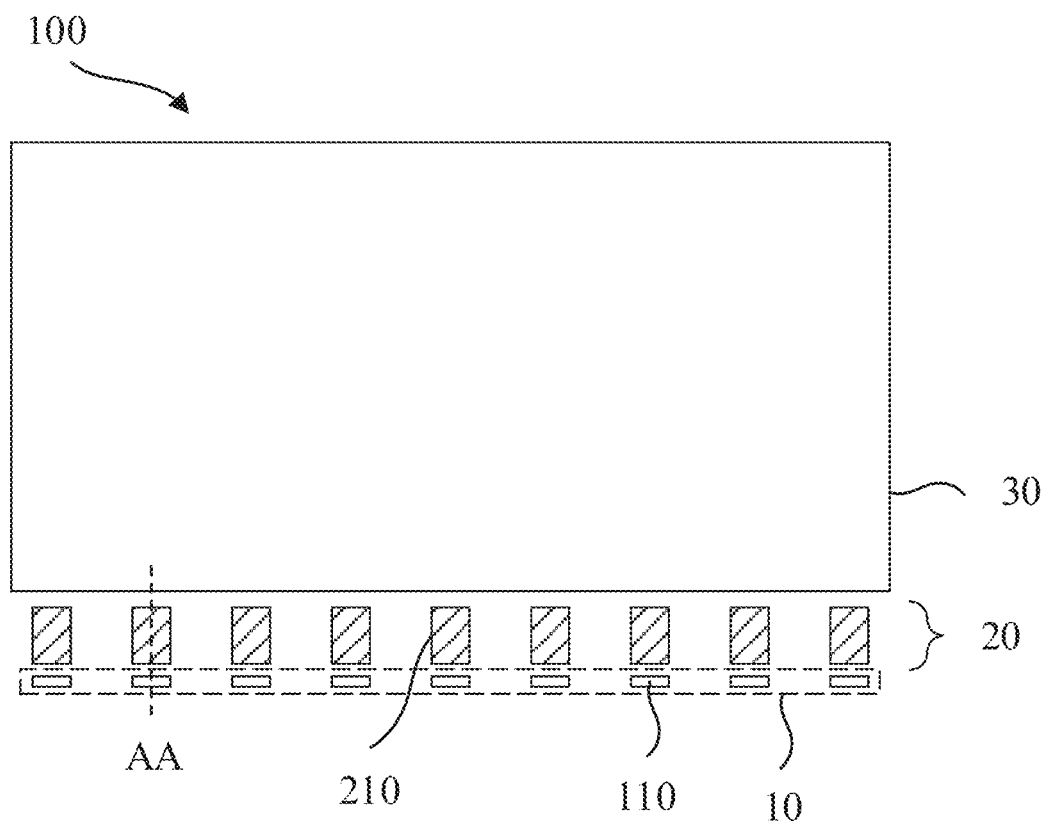
FIG. 1 is a first top view of a backlight module of the present application.

To make the objective, the technical solution, and the effect of the present application clearer and more explicit, the present application will be further described in detail below with reference to the accompanying drawings. It should be understood that the specific embodiments described here are only used to explain the present application instead of being used to limit the present application.

Conventional viewing angle adjustment and anti-peep display technologies mainly comprise two types: A first type solution adds an anti-peep film of a shutter microstructure and a liquid crystal film with a variable haze between a backlight module and a display panel to achieve switching of viewing angle. A second type solution adds a third electrode in the display panel to control switching of viewing angle of the display panel. The first type solution has low light energy utilization rate and high power consumption, which is unfavorable for application to mobile devices. The anti-peep mode of the second type solution has low contrast at a front viewing angle and poor display effect. The present application sets forth a backlight module and a display device based on the above technical issue.

With reference to FIGS. 1 to 10, the embodiment of the present application provides a backlight module 100 comprising a light source assembly 10, a light concentration structure 20, a light guide structure 30, and a viewing angle switch assembly 40.

The light concentration structure 20 is disposed along a light exiting direction of the light source assembly 10, and the light concentration structure 20 concentrates light emitted from the light source assembly 10 in a predetermined angle range and emits out the light. The light guide structure 30 is disposed along a light exiting direction of the light concentration structure 20. The light guide structure 30 guides the light concentrated by the light concentration structure 20 in a way of mirror reflection and emits out from a light exiting surface of the light guide structure 30. The viewing angle switch assembly 40 is disposed along the light exiting direction of the light guide structure 30. The viewing angle switch assembly 40 guides light emitted from the light guide structure 30 outward at a first viewing angle or a second viewing angle.

In the present embodiment, the first viewing angle and the second viewing angle are not the same. For example, the first viewing angle can be a small viewing angle ranging from −30° to +30°, i.e., an anti-peep mode. The second viewing angle can be a large viewing angle ranging from −67° to +67°, i.e., a wide-angle mode.

The present application, by disposing the viewing angle switch assembly 40 on the backlight module 100, makes the display device able to switch between the wide-angle mode and the anti-peep mode such that the display device achieves a switchable viewing angle display effect, and simultaneously, by disposing the light concentration structure 20 between the light source assembly 10 and the light guide structure 30, emits the light emitted from the light source assembly 10 in the predetermined angle range into the light guide structure 30 and guides out the light in a way of mirror reflection by the light guide structure 30 such that on the basis of the anti-peep display function, the display device has higher light energy utilization rate and contrast.

A technical solution of the present application is described according to a specific embodiment as follows.

With reference to FIGS. 1 to 4, the light concentration structure 20 comprises at least one light concentration element 210, the light concentration element 210 comprises a light incident surface 211 near the light source assembly 10, a light exiting surface 212 near the light guide structure 30, and a light concentration curved surface 213 located between the light incident surface 211 and the light exiting surface 212. The light concentration curved surface 213 concentrates light entering the light concentration curved surface 213 in the predetermined angle range and emits the light out from the light exiting surface 212.

Figure 3:
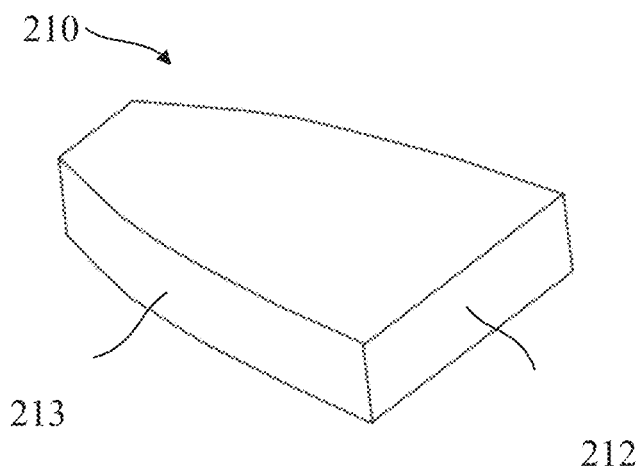
FIG. 3 is a schematic perspective structural view of a light concentration element of the backlight module of the present application.
Figure 4:
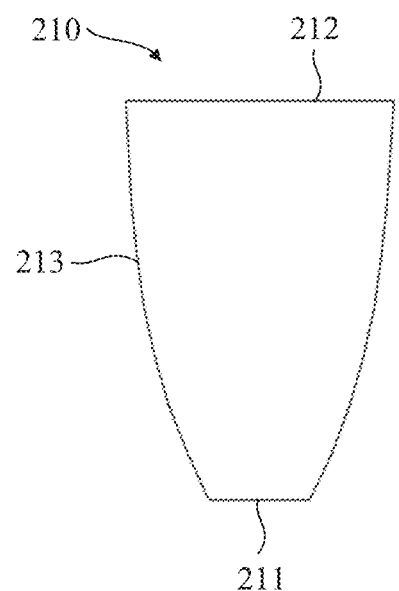
FIG. 4 is a top view of the light concentration element in the backlight module of the present application.

With reference to FIGS. 3 and 4, the light incident surface 211 can be parallel to the light exiting surface 212. Light emitted from the light source assembly 10 enters the light concentration element 210 through the light incident surface 211. When an included angle between the light entering the light concentration element 210 and the light exiting surface 212 is within the predetermined angle range, the light entering the light concentration element 210 can directly be emitted out from the light exiting surface 212. When the included angle between the light entering the light concentration element 210 and the light exiting surface 212 is out of the predetermined angle range, the light entering the light concentration element 210, after being reflected by the light concentration curved surface 213 at least one time, can be emitted out by the included angle between the light incident surface 211 and the light exiting surface 212 within the predetermined angle range.

In the present embodiment, a cross-sectional profile of the light concentration curved surface 213 perpendicular to the light incident surface 211 or the light exiting surface 212 can be one of a parabola, a polynomial curve, a Bezier curve, a B-spline curve, or an uneven B-spline curve.

In the present embodiment, the cross-sectional profile of the light concentration curved surface 213 can be adjusted according to the predetermined angle range. For example, the predetermined angle range can be the included angle between the light concentration curved surface 213 and the light exiting surface 212 from 60 degrees to 90 degrees. Furthermore, along a direction parallel to the light incident surface 211 or the light exiting surface 212, a cross-section of the light concentration element 210 can be a rectangle, a circle, or other polygonal structure, and is not limited here.

In the present embodiment, when the light incident surface 211 and the light receiving surface are circular, a surface between the light incident surface 211 and the light exiting surface 212 or a connection surface connected to the light concentration curved surface 213 can be another light concentration curved surface 213 including a cross-sectional profile the same as that of the light concentration curved surface 213, which is not limited here.

Figure 2:
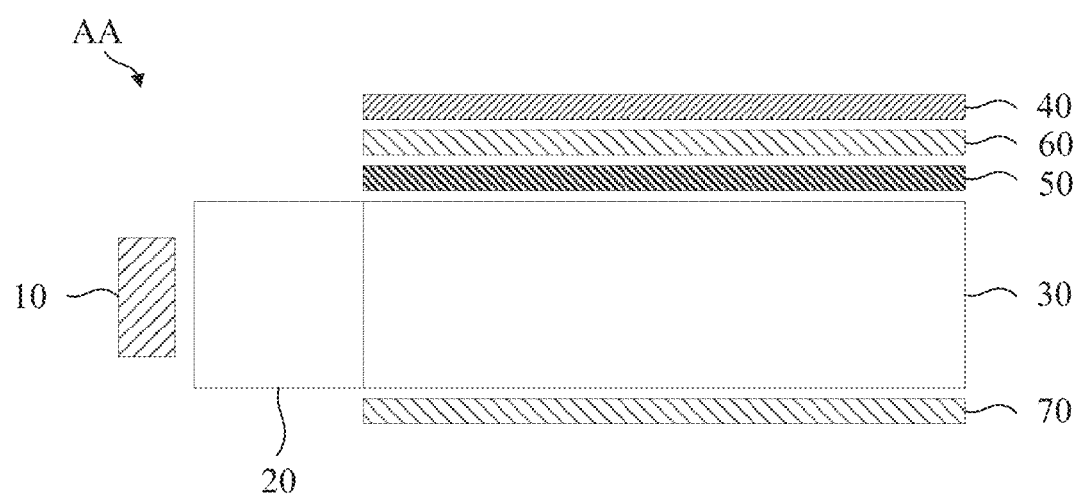
FIG. 2 is a cross-sectional view along line A-A in FIG. 1.

With reference to FIGS. 1 and 2, the light source assembly 10 comprises a plurality of light emitting diode (LED) devices 110, and the light concentration structure 20 comprises a plurality of light concentration elements 210 in one-to-one correspondence with the LED devices 110.

In the present embodiment, a number of the light concentration elements 210 is equal to a number of the LED devices 110, and one LED device 110 corresponds to one light concentration element 210. A light incident surface 211 of the light concentration element 210 faces the LED devices 110, and the light exiting surface 212 of the light concentration element 210 faces away from the LED devices 110. An area of the light incident surface 211 can be greater than an area of an effective light emitting surface of the LED devices 110, and an orthographic projection of the light incident surface 211 on the light guide structure 30 covers an orthographic projection of the effective light emitting surface of the LED devices 110 on the light guide structure 30 such that light emitted from the LED devices 110 can be guided into the light concentration element 210 as much as possible.

In the present embodiment, one light concentration element 210 can correspond to a plurality of the LED devices 110. For example, one light concentration element 210 can correspond to two LED devices 110.

In the present embodiment, an interval between the light concentration element 210 and the LED devices 110 can be less than a first threshold, for example, the first threshold can be 2 mm. Because the LED devices 110 emit light at various angles, there would be some loss of light source when the interval between the LED devices 110 and the light concentration element 210 is overly large. When the interval between the light concentration element 210 and the LED devices 110 is 2 mm, all light emitted from the LED devices 110 enters the light concentration element 210. When the interval between the light concentration element 210 and the LED devices 110 is 0 mm, namely, the light incident surface 211 of the light concentration element 210 coincides with the light emitting surface of the LED devices 110, a utilization rate of light emitted from the LED devices 110 is optimal.

Figure 5:
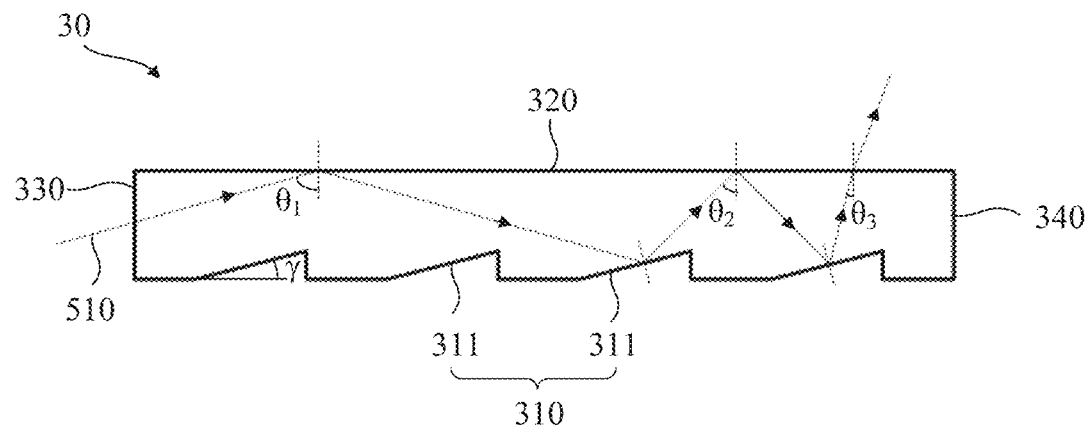
FIG. 5 is a first schematic light path view of a light guide structure in the backlight module of the present application.
Figure 7:
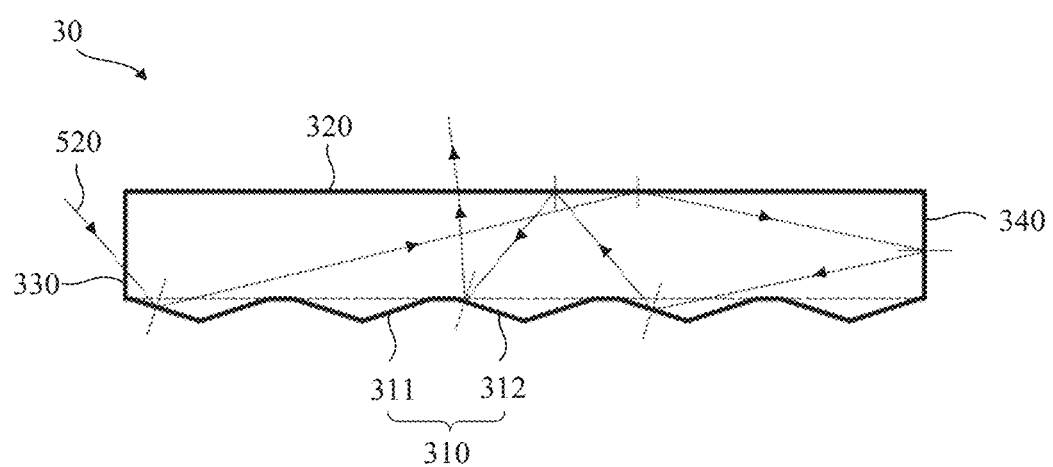
FIG. 7 is a third schematic light path view of the light guide structure in the backlight module of the present application.

With reference to FIGS. 5 and 7, in the backlight module 100 of the present application, the light guide structure 30 can comprise a reflective bottom surface 310, a light guide exiting surface 320 located opposite to the reflective bottom surface 310, and a light guide incident surface 330 and a mirror reflective surface 340 located between the reflective bottom surface 310 and the light guide exiting surface 320. The light guide incident surface 330 is disposed near the light source assembly 10, and the light guide incident surface 330 and the mirror reflective surface 340 are disposed oppositely.

In the present embodiment, the reflective bottom surface 310 comprises at least one reflective surface disposed on and protruding from the light guide structure 30. The reflective surface forms an acute angle with each of the light guide exiting surface 320, the light guide incident surface 330, and the mirror reflective surface 340.

In the present embodiment, the light guide structure 30 is configured to guide and emit the light emitted from the light source assembly 10 outward in a way of mirror reflection. In other words, the light guide structure 30 guides the light emitted from the light source assembly 10 outward without employing scattering or diffuse reflection. Therefore, when the light concentration structure 20 emits the light emitted from the light source assembly 10 in the predetermined angle range into the light guide structure 30, to prevent the light entering the light guide structure 30 from undergoing scattering or diffuse reflection, at least one reflective surface disposed and protruding from the light guide structure 30 is disposed on a bottom surface of the light guide structure 30 to cooperate with the mirror reflective surface 340 to guide the light entering the light guide structure 30 out from the light guide exiting surface by reflection of the mirror surface, which can improve utilization rate and display contrast of the light source.

With reference to FIG. 5, the reflective bottom surface 310 can comprise a plurality of first reflective surfaces 311, the first reflective surfaces 311 are arranged in an array, and the first reflective surfaces 311 are disposed along a direction facing the light guide incident surface 330 and the light guide exiting surface 320. An included angle between the first reflective surfaces 311 and each of the light guide incident surface 330 and the light guide exiting surface 320 is an acute angle. The first reflective surfaces 311 guide light entering the light guide incident surface 330 out from the light guide exiting surface 320.

In the present embodiment, the first reflective surfaces 311 can form a smaller included angle with the light guide exiting surface 320, and can make first incident light 510 forming a smaller included angle with the light guide exiting surface 320 be reflected by the first reflective surfaces 311 in the light guide structure 30 at least one time and then be guided out of the light guide exiting surface 320. For example, the first incident light 510 can be light passing through the light concentration element 210 and entering the light guide incident surface 330 light, the first incident light 510 is reflected at least one time and then is guided out of the light guide exiting surface 320.

In the present embodiment, after the first incident light 510 is reflected by the first reflective surface 311 once, an incident angle of the first incident light 510 would decrease according to the included angle between the first reflective surface 311 and the light guide exiting surface 320, and the first incident light 510 is emitted out from the light guide exiting surface 320 when a critical angle condition of the light guide exiting surface 320 is fulfilled.

In the present embodiment, an included angle between the first reflective surface 311 and the light guide exiting surface 320 can be greater than 4 degrees and less than 10 degrees.

With reference to FIG. 5, the included angle γ between the first reflective surfaces 311 and the light guide exiting surface 320 can be 5 degrees, and an initial incident angle of the first incident light 510 is $\theta_1$. After a first total reflection is performed on the light guide exiting surface 320, light is reflected by one of the first reflective surfaces 311 to the light guide exiting surface 320 to perform a second total reflection. An incident angle after the second total reflection is $\theta_2=\theta_1-2\gamma$. Second, when light is reflected by another of the first reflective surfaces 311 to the light guide exiting surface 320 to perform a third total reflection, an incident angle of the incident light after the third total reflection is $\theta_3=\theta_1-4\gamma$. When the incident angle $\theta_3$ of the third total reflection is less than a critical angle of the light guide exiting surface 320, the first incident light 510 is emitted out from the light guide exiting surface 320.

In the present embodiment, when the first incident light 510 initially irradiates the light guide structure 30, the included angle between the first incident light 510 and the light guide exiting surface 320 can be within the predetermined angle range. For example, when the first incident light 510 initially irradiates the light guide structure 30, a value range of the included angle between the first incident light 510 and the light guide exiting surface 320 can be 0 degree to 30 degrees. Because the included angle between the first incident light 510 and the light guide exiting surface 320 and an initial incident angle $\theta_1$ of the first incident light 510 are complementary, a value range of the initial incident angle $\theta_1$ of the first incident light 510 is greater than 60 degrees and is less than 90 degrees.

Figure 6:
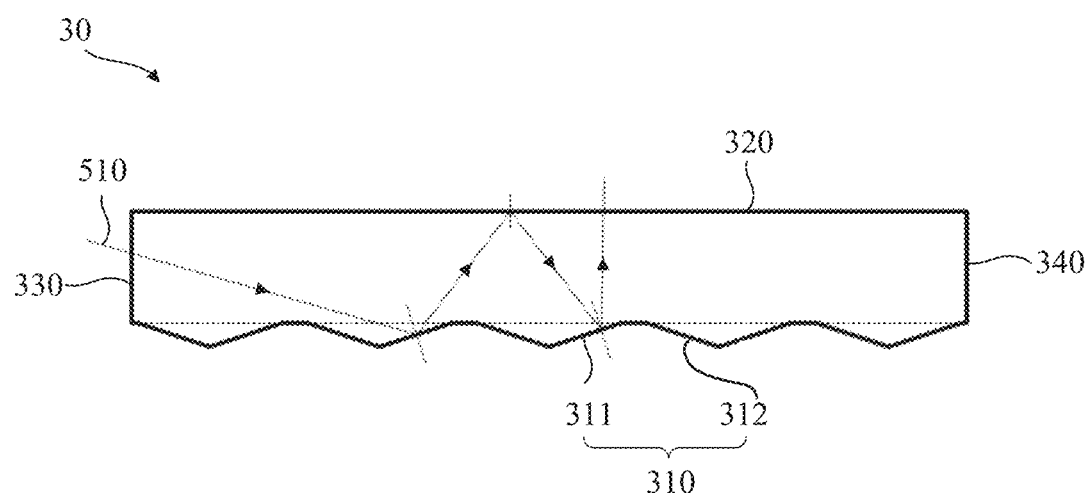
FIG. 6 is a second schematic light path view of the light guide structure in the backlight module of the present application.

With reference to FIGS. 6 and 7, the reflective bottom surface 310 further comprises a plurality of second reflective surfaces 312. The second reflective surfaces 312 are disposed along a direction facing away from the light guide incident surface 330 and facing the light guide exiting surface 320. The first reflective surfaces 311 and the second reflective surfaces 312 are connected to each other and are disposed symmetrically. The first reflective surfaces 311 and the second reflective surfaces 312 guide the light entering the light guide incident surface 330 out from the light guide exiting surface 320.

With reference to FIG. 6, the light path principle view in FIG. 6 is similar to that in FIG. 5. When the value range of the initial incident angle $\theta_1$ of the first incident light 510 is greater than 60 degrees and less than 90 degrees, incident light can only be guided out through the first reflective surfaces 311.

With reference to FIG. 7, the second reflective surfaces 312 are disposed along a direction facing away from the light guide incident surface 330 and facing the light guide exiting surface 320. Namely, the second reflective surfaces 312 form an obtuse angle with the light guide incident surface 330 and form an acute angle with the light guide exiting surface 320. The mirror reflective surface 340 cooperates with the second reflective surfaces 312. The second reflective surfaces 312 can guide a second incident light 520 forming a larger included angle with the light guide exiting surface 320 out from the light guide exiting surface 320 by multiple reflections of the second reflective surfaces 312 and the mirror reflective surface 340.

In the present embodiment, guiding the second incident light 520 out from the light guide exiting surface 320 can be divided into two stages. In the first stage, the second incident light 520 performs at least one total reflection on the second reflective surfaces 312 and/or the light guide exiting surface 320, and then performs a mirror surface reflection on the mirror reflective surface 340. In the second stage, the second incident light 520, after performing the mirror surface reflection on the mirror reflective surface 340, forms a smaller included angle with the light guide exiting surface 320 and irradiates one of the second reflective surfaces 312, then performs at least one reflection between the second reflective surfaces 312 and the light guide exiting surface 320, and then is guided out from the light guide exiting surface 320.

In the second stage, after the second incident light 520 is reflected by the second reflective surface 312 once, an incident angle between the second incident light 520 would decrease according to the included angle between the second reflective surfaces 312 and the light guide exiting surface 320, and the second incident light 520 is emitted out from the light guide exiting surface 320 when the critical angle condition of the light guide exiting surface 320 is fulfilled. Details can refer to light path views of the first incident light 510 emitted out from the light guide exiting surface 320 in FIGS. 5 and 6, and would not be described repeatedly here.

Figure 8:
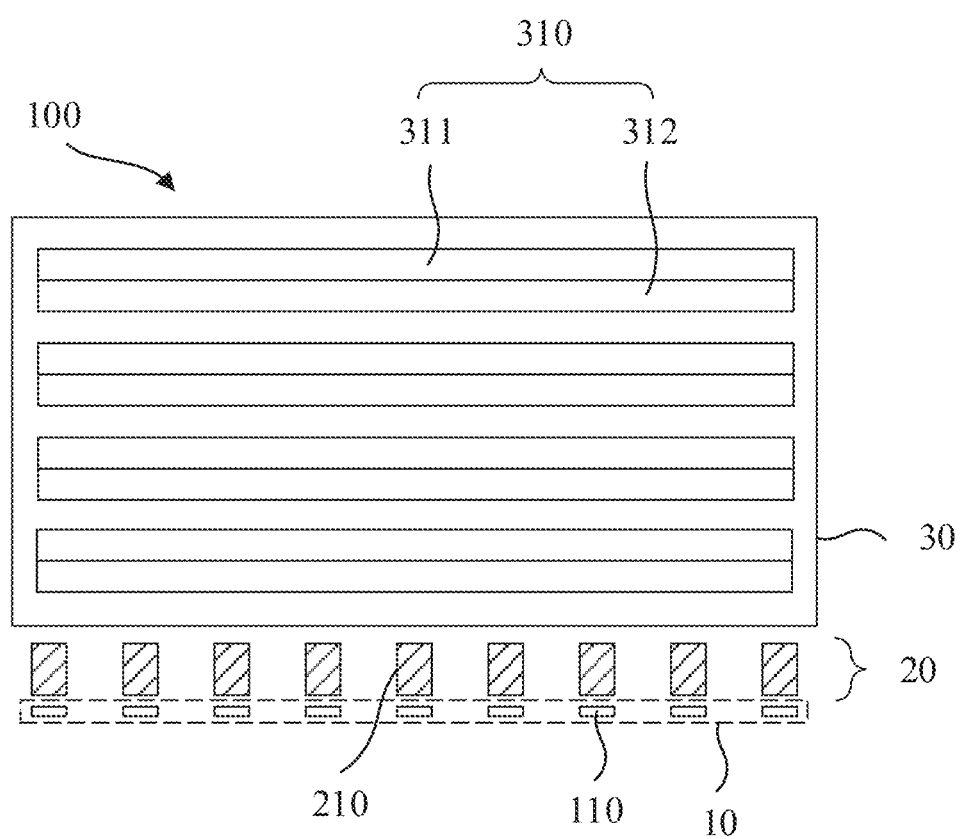
FIG. 8 is a second top view of the backlight module of the present application.

With reference to FIG. 8, the first reflective surfaces 311 and the second reflective surfaces 312 can be disposed on a bottom of the light guide structure 30 disposed in form of concave or convex formation.

In the present embodiment, the first reflective surfaces 311 and the second reflective surfaces 312 protrude outward from the bottom of the light guide structure 30. With reference to FIG. 8, the first reflective surfaces 311 can be strip-shaped, and the first reflective surfaces 311 are parallel and are arranged in a single column. The second reflective surfaces 312 are also strip-shaped. Alternatively, the first reflective surfaces 311 and the second reflective surfaces 312 are arranged in an array, and the first reflective surfaces 311 and the second reflective surfaces 312 can be V-shaped. Alternatively, under a condition satisfying that the second reflective surfaces 312 are disposed facing away from the light guide incident surface 330 and facing the light guide exiting surface 320 and satisfying that the first reflective surfaces 311 are disposed facing the light guide incident surface 330 and the light guide exiting surface 320, the first reflective surfaces 311 and the second reflective surfaces 312 can also be arc surfaces, which is not limited thereto.

Figure 9:
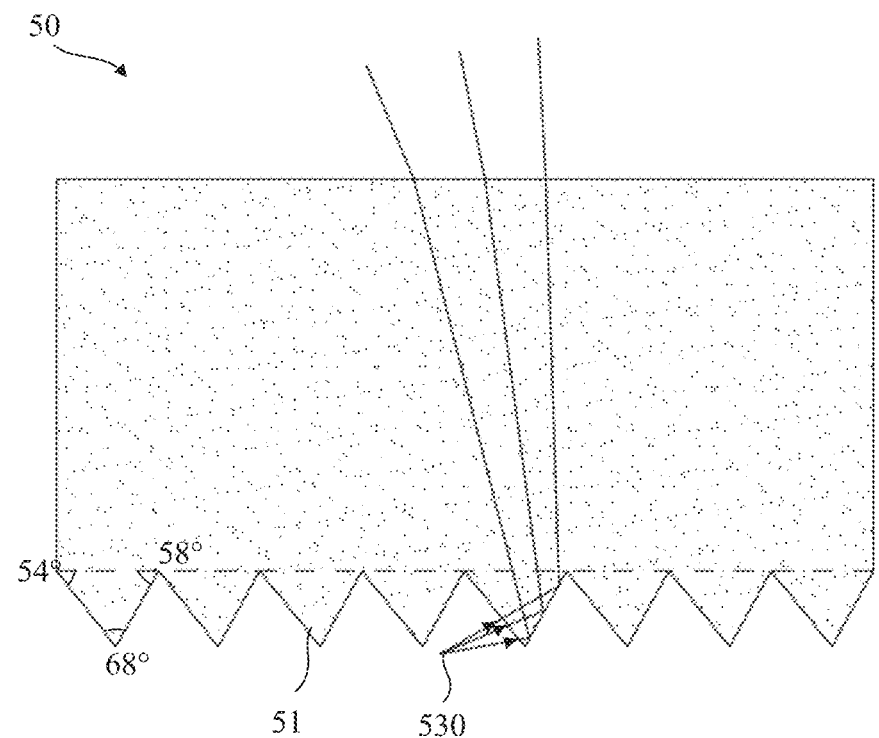
FIG. 9 is a schematic structural view of an inverse prism in the backlight module of the present application.

With reference to FIGS. 2 and 9, the backlight module 100 further comprises an inverse prism 50 disposed between the light guide structure 30 and the viewing angle switch assembly 40. The inverse prism 50 is configured to collimate a third incident light 530 emitted out from the light guide structure 30.

In the present embodiment, the inverse prism 50 comprises a plurality of inverse prism blocks 51 protruding near a side of the light guide structure 30. The third incident light 530 implements collimation under an effect of the inverse prism blocks 51. A cross-section of the inverse prism blocks 51 can be a triangle. For example, the triangle is an acute angle triangle including three inner angles of 68 degrees, 54 degrees, and 58 degrees, and the inner angle near the light guide structure 30 is 68 degrees.

Figure 10:
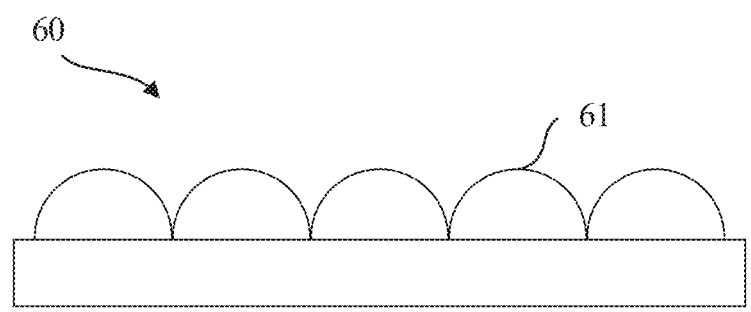
FIG. 10 is a schematic structural view of a cylindrical mirror in the backlight module of the present application.

With reference to FIGS. 2 and 10, the backlight module 100 further comprises a cylindrical mirror 60 disposed between the inverse prism 50 and the viewing angle switch assembly 40.

In the present embodiment, the cylindrical mirror 60 is an aspherical lens, and the cylindrical mirror 60 is mainly applied to a design demand for changing a size of an image, for example, changing a point light spot into a linear light spot, changing a height of an image without changing a width, or concentrating or diffusing a light ray along a single axis to transform a collimation light source to a linear light source.

With reference to FIG. 10, the cylindrical mirror 60 can comprise a plurality of convex surfaces 61 facing the viewing angle switch assembly 40, and the convex surfaces 61 can be semi-spherical surfaces or convex surfaces 61 with a certain angle. The convex surfaces 61 concentrate collimation light from the inverse prism 50 toward a single axis to transform a collimation light source to a linear light source.

Figure 11:
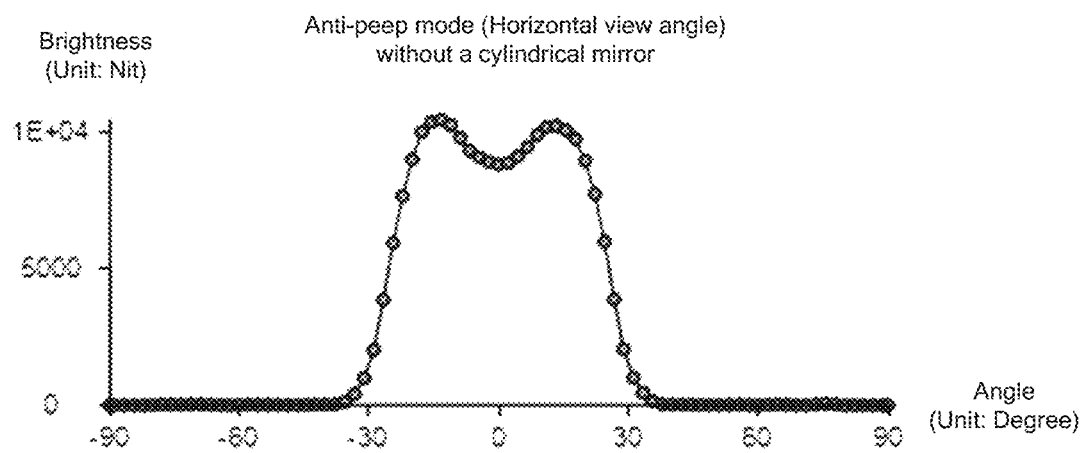
FIG. 11 is a brightness-viewing angle curve chart of the backlight module of the present application under an anti-peep mode without disposing the cylindrical mirror.
Figure 12:
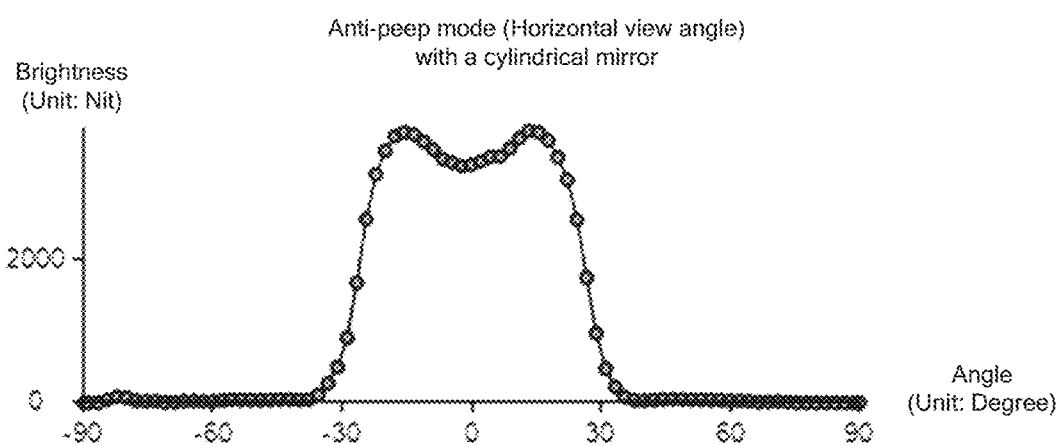
FIG. 12 is a brightness-viewing angle curve chart of the backlight module of the present application under the anti-peep mode with the cylindrical mirror disposed.

With reference to brightness curve chart of FIGS. 11 and 12, FIG. 11 is a brightness-viewing angle curve chart of the backlight module 100 of the present application under an anti-peep mode without disposing a cylindrical mirror 60, and FIG. 12 is a brightness-viewing angle curve chart of the backlight module 100 of the present application under the anti-peep mode with the cylindrical mirror 60 disposed.

Taking a viewing angle from −30° to +30° in FIGS. 11 and 12 as an example, when no cylindrical mirror 60 is disposed, a brightness of viewing angle from −30° to +30° is distributed around 10000 nits. When the cylindrical mirror 60 is disposed, a brightness of a viewing angle from −30° to +30° is around 4000 nits. Therefore, when the cylindrical mirror 60 is not disposed, collimation light emitted from the inverse prism 50 is overly sharp in a vertical direction, namely, decay of the brightness based on variation of the angle is too fast, i.e., from 10000 nits down to 0 nit. When the display device is disposed with the cylindrical mirror 60, the brightness decays from 4000 nits to 0 nit based on variation of the angle, an attenuation amplitude slows down, which improves user's experience.

With reference to FIG. 2, a mirror reflection plate 70 is further disposed on a side of the light guide structure 30 away from the inverse prism 50. The mirror reflection plate 70 faces the light exiting direction of the backlight module 100, and is configured to reflect light leaked out from the light guide structure 30 to the light exiting direction of the backlight module 100 to further improve a light energy utilization rate of the backlight module 100.

With reference to FIG. 2, the viewing angle switch assembly 40 can comprise a liquid crystal layer and a driver electrode layer driving the liquid crystal layer to rotate. The driver electrode layer can be a first electrode layer and a second electrode layer located on two sides of the liquid crystal layer respectively. The first electrode layer is disposed near the light guide structure 30, and the second electrode layer is disposed away from the light guide structure 30. A driving electrical field formed by the first electrode layer and the second electrode layer drives the liquid crystal layer to rotate to adjust light emitted out from the light guide structure 30.

In the present embodiment, when the driving electrical field formed by the driver electrode layer is within a first predetermined range, the viewing angle switch assembly 40 guides light emitted out from the light guide structure 30 outward at a first viewing angle. When the driving electrical field formed by the driver electrode layer is within a second predetermined range, the viewing angle switch assembly 40 guides light emitted out from the light guide structure 30 outward at a second viewing angle.

In the present embodiment, the liquid crystal layer can be but is not limited to polymer network liquid crystals or polymer dispersion liquid crystals. When not driven by the electrical field, the above liquid crystal molecules are in a haze state such that light entering the liquid crystal layer is scattered. When driven by the electrical field, the above liquid crystal molecules are distributed regularly and would not change an angle of light entering the liquid crystal layer.

In the present embodiment, the driver electrode layer can comprise a common electrode layer and a pixel electrode layer. For liquid crystals in vertical alignment, the common electrode layer and the pixel electrode layer can be located on the two sides of the liquid crystal layer respectively. For liquid crystals in horizontal alignment, the common electrode layer and the pixel electrode layer can be located on the same side of the liquid crystal layer.

In the present embodiment, when the driving electrical field in the viewing angle switch assembly 40 is within the first predetermined range, liquid crystal molecules are affected by the electrical field and are arranged regularly, are equivalent to a flat glass plate, and would not change a light exiting direction of small angle light entering the viewing angle switch assembly 40 such that the light entering the display panel on the backlight module 100 is kept at the small angle to achieve the anti-peep mode of the display device. The first predetermined range of the present application has no specific limitation and can be limited according to types of the liquid crystals as long as an angle of incident light is changed.

In the present embodiment, when the driving electrical field in the viewing angle switch assembly 40 is within the second predetermined range, small angle light entering the viewing angle switch assembly 40 is dispersed when passing through the liquid crystals. In other words, small angle light is scattered in the viewing angle switch assembly 40, and enters the display panel on the backlight module 100 in total angles to achieve the wide-angle mode of the display device. The second predetermined range can be 0 or the driver electrode layer is not powered such that the viewing angle switch assembly 40 is in the haze state.

In the present embodiment, the backlight module 100 can achieve different backlight modes by adjusting a working state of the viewing angle switch assembly 40. For example, in the situation of the viewing angle switch assembly 40 being powered up, the backlight mode is an anti-peep mode. In the situation of the viewing angle switch assembly 40 being powered off, the backlight mode is a wide-angle mode.

Figure 13:
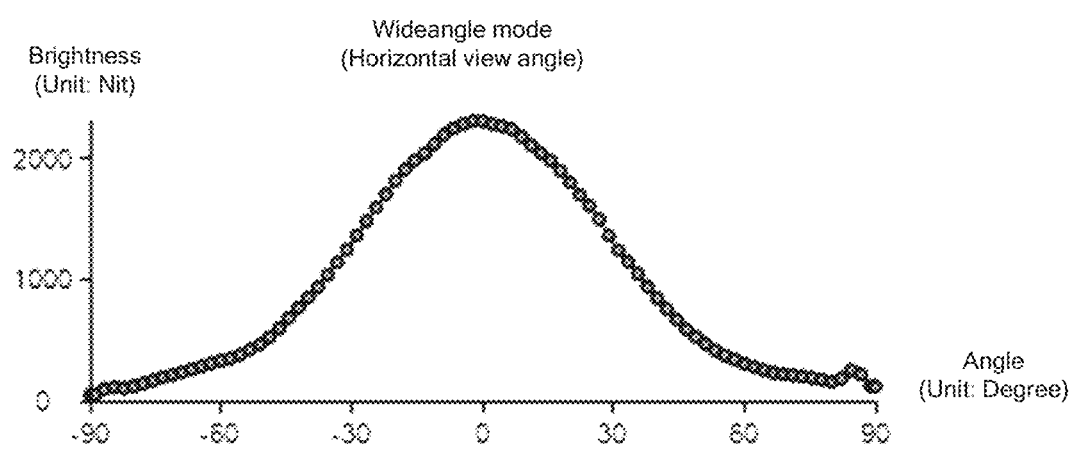
FIG. 13 is a brightness-viewing angle curve chart of the backlight module of the present application under a wide-angle mode without disposing the cylindrical mirror.

With reference to FIG. 13, FIG. 13 is a brightness-viewing angle curve chart of the backlight module 100 of the present application under a wide-angle mode without disposing the cylindrical mirror 60.

Under the wide-angle mode, the viewing angle improvement layer is in a working state such that small angle light entering the viewing angle switch assembly 40 is scattered, to enter the display panel of the backlight module 100 in total angles. A viewing angle is in a range of about −67° to +67°, the highest brightness is concentrated at zero viewing angle, namely, it is at a viewing angle perpendicular to the backlight module 100, and has the highest brightness of about 2300 nits.

Under the anti-peep mode, the viewing angle improvement layer is in a non-working state, and the viewing angle improvement layer would not change a light exiting direction of a small angle light entering the viewing angle switch assembly 40. The viewing angle is in a range of about −30° to +30°, the highest brightness is about 10500 nits, and the highest brightness is mainly concentrated in a range from −16° to −9° and a range from +9° to +16°.

Compared to the wide-angle mode, the anti-peep mode not only lowers the viewing angle, but also improves display brightness such that the display device has higher light energy utilization rate and contrast.

In the present embodiment, other optical adjustment film layers such as an optical film layer for adjusting a light exiting angle or a light exiting brightness can be disposed between the viewing angle switch assembly 40 and the cylindrical mirror 60.

The embodiment of the present application also provides a display device comprising the backlight module as mentioned in the above embodiments, and a display panel disposed on the backlight module.

The present application discloses a backlight module and a display device. The backlight module comprises a light source assembly, a light concentration structure concentrating light emitted from the light source assembly and emitting the light in a predetermined angle range, a light guide structure guiding the light concentrated by the light concentration structure in a way of mirror reflection out from a light exiting surface of the light guide structure, and a viewing angle switch assembly, wherein the viewing angle switch assembly guides the light emitted from the light guide structure outward at a first viewing angle or a second viewing angle. The present application, through the viewing angle switch assembly, makes the display device realize an anti-peep display effect with a switchable viewing angle, and simultaneously, by disposing the light concentration structure between the light source assembly and the light guide structure, emits light emitted from the light source assembly in the predetermined angle range into the light guide structure, and guides out light in a way of mirror reflection by the light guide structure such that on the basis of including an anti-peep display function, the display device has higher light energy utilization rate and contrast.

It can be understood that for a person of ordinary skill in the art, equivalent replacements or changes can be made according to the technical solution of the present application and its inventive concept, and all these changes or replacements should belong to the scope of protection of the appended claims of the present application.

What is claimed is:

1. A backlight module, comprising:
a light source assembly;
a light concentration structure disposed along a light exiting direction of the light source assembly, concentrating light emitted from the light source assembly and emitting the light in a predetermined angle range;
a light guide structure disposed along a light exiting direction of the light concentration structure, guiding and emitting the light concentrated by the light concentration structure outward in a way of mirror reflection out from a light exiting surface of the light guide structure; and
a viewing angle switch assembly disposed along a light exiting direction of the light guide structure, guiding the light emitted from the light guide structure outward at a first viewing angle or a second viewing angle;
wherein the light concentration structure comprises at least one light concentration element, the light concentration element comprises a light incident surface disposed near the light source assembly, a light exiting surface disposed near the light guide structure, and two light concentration curved surfaces located opposite to each other between the light incident surface and the light exiting surface, and the light incident surface and the light exiting surface are disposed parallelly;
wherein the light exiting surface of the light concentration element is greater than the light incident surface of the light concentration element, and internal sides of the light concentration curved surfaces facing each other are concave;
wherein the light guide structure comprises a reflective bottom surface, a light guide exiting surface located opposite to the reflective bottom surface, and a light guide incident surface and a mirror reflective surface disposed between the reflective bottom surface and the light guide exiting surface, wherein the light guide incident surface is disposed near the light source assembly, and the light guide incident surface and the mirror reflective surface are disposed oppositely:
wherein the reflective bottom surface comprises a plurality of sawtooth-shaped reflective portions disposed evenly on and protruding from the light guide structure and arranged in an array;
wherein each of the sawtooth-shaped reflective portions comprises a first reflective surface, a vertical surface, and a connection flat surface, the vertical surface is formed perpendicular to the light guide exiting surface, the connection flat surface is connected between the first reflective surface and the vertical surface and parallel to the light guide exiting surface, and the connection flat surfaces of the sawtooth-shaped reflective portion are the same, an included angle between the first reflective surface and the light guide exiting surface is an acute angle, and the first reflective surfaces are configured to guide incident light entering the light guide incident surface out from the light guide exiting surface.

2. The backlight module according to claim 1, wherein a cross-sectional profile of the light concentration curved surface perpendicular to the light incident surface or the light exiting surface is one of parabola, polynomial curve, Bezier curve, or B-spline curve.

3. The backlight module according to claim 1, wherein the light source assembly comprises a plurality of LED devices, and the light concentration structure comprises a plurality of the light concentration elements in one-to-one correspondence with the LED devices.

4. The backlight module according to claim 1, wherein the backlight module further comprises an inverse prism disposed between the light guide structure and the viewing angle switch assembly, the inverse prism comprises a plurality of inverse prism blocks, and the inverse prism blocks are disposed near a side of the light guide structure.

5. The backlight module according to claim 4, wherein the backlight module further comprises a cylindrical mirror disposed between the inverse prism and the viewing angle switch assembly; and
wherein the cylindrical mirror comprises a plurality of convex surfaces facing the viewing angle switch assembly.

6. A display device, wherein the display device comprises a backlight module and a display panel disposed on the backlight module, and the backlight module comprises:
a light source assembly;
a light concentration structure disposed along a light exiting direction of the light source assembly, concentrating light emitted from the light source assembly, and emitting the light in a predetermined angle range;
a light guide structure disposed along a light exiting direction of the light concentration structure, guiding and emitting the light concentrated by the light concentration structure outward in a way of mirror reflection out from a light exiting surface of the light guide structure; and
a viewing angle switch assembly disposed along a light exiting direction of the light guide structure, and guiding the light emitted from the light guide structure outward at a first viewing angle or a second viewing angle;
wherein the light concentration structure comprises at least one light concentration element, the light concentration element comprises a light incident surface disposed near the light source assembly, a light exiting surface disposed near the light guide structure, and two light concentration curved surfaces located opposite to each other between the light incident surface and the light exiting surface, and the light incident surface and the light exiting surface are disposed parallelly;
wherein the light exiting surface of the light concentration element is greater than the light incident surface of the light concentration element, and internal sides of the light concentration curved surfaces facing each other are concave;
wherein the light guide structure comprises a reflective bottom surface, a light guide exiting surface located opposite to the reflective bottom surface, and a light guide incident surface and a mirror reflective surface disposed between the reflective bottom surface and the light guide exiting surface, wherein the light guide incident surface is disposed near the light source assembly, and the light guide incident surface and the mirror reflective surface are disposed oppositely;
wherein the reflective bottom surface comprises a plurality of sawtooth-shaped reflective portions disposed evenly on and protruding from the light guide structure and arranged in an array;
wherein each of the sawtooth-shaped reflective portions comprises a first reflective surface, a vertical surface, and a connection flat surface, the vertical surface is formed perpendicular to the light guide exiting surface, the connection flat surface is connected between the first reflective surface and the vertical surface and parallel to the light guide exiting surface, and the connection flat surfaces of the sawtooth-shaped reflective portion are the same, an included angle between the first reflective surface and the light guide exiting surface is an acute angle, and the first reflective surfaces are configured to guide incident light entering the light guide incident surface out from the light guide exiting surface.

7. The display device according to claim 6, wherein a cross-sectional profile of the light concentration curved surface perpendicular to the light incident surface or the light exiting surface is one of parabola, polynomial curve, Bezier curve, or B-spline curve.

8. The display device according to claim 6, wherein the light source assembly comprises a plurality of LED devices, and the light concentration structure comprises a plurality of the light concentration elements in one-to-one correspondence with the LED devices.

9. The display device according to claim 6, wherein the backlight module further comprises an inverse prism disposed between the light guide structure and the viewing angle switch assembly, the inverse prism comprises a plurality of inverse prism blocks, and the inverse prism blocks are disposed near a side of the light guide structure.

10. The display device according to claim 9, wherein the backlight module further comprises a cylindrical mirror disposed between the inverse prism and the viewing angle switch assembly; and wherein the cylindrical mirror comprises a plurality of convex surfaces facing the viewing angle switch assembly.

* * * * *